(12) United States Patent
Höfferl et al.

(10) Patent No.: US 7,700,370 B2
(45) Date of Patent: Apr. 20, 2010

(54) PROCESS FOR OPTIMIZING PROCESS FLOWS

(75) Inventors: Franz Höfferl, Vienna (AT); Dietmar Steinschorn, Vienna (AT)

(73) Assignee: OMV Refining & Marketing GmbH, Vienna (AT)

( * ) Notice: Subject to any disclaimer, the term of this patent is extended or adjusted under 35 U.S.C. 154(b) by 1199 days.

(21) Appl. No.: 11/199,814

(22) Filed: Aug. 9, 2005

(65) Prior Publication Data
US 2006/0030962 A1   Feb. 9, 2006

(30) Foreign Application Priority Data
Aug. 9, 2004   (AT) ............................. A 1356/2004

(51) Int. Cl.
*G01N 1/10*   (2006.01)
(52) U.S. Cl. .................. 436/180; 436/179; 700/91; 702/31
(58) Field of Classification Search ............... 700/266, 700/101, 99, 28, 36, 271, 272, 91; 707/104.1; 705/1; 436/179, 180; 422/129, 134; 702/31
See application file for complete search history.

(56) References Cited

U.S. PATENT DOCUMENTS

2002/0069210 A1   6/2002  Navani et al.
2003/0018490 A1   1/2003  Magers et al.
2003/0125818 A1   7/2003  Johnson

OTHER PUBLICATIONS

Steinschorn et al.: "Refinery scheduling using mixed integer LP and dynamic recursion", in: National Petroleum Refiners Assoc., NPRA Computer Conference, Nov. 17-19, 1997, New Orleans, Louisiana, USA.
Höfferl et al.: "Closing the Gap the OMV Scheduling System", in: Procedings of the World Petroleum Congress, 1997.
Coxhead: "Integrated Plannning and Scheduling Systems for the Refining Industry", in: Optimization in Industry,2, 1994.

*Primary Examiner*—Jill Warden
*Assistant Examiner*—Dwayne K Handy
(74) *Attorney, Agent, or Firm*—Henry M. Feiereisen; Ursula B. Day

(57) ABSTRACT

A process is disclosed for optimizing process flows in a facility, for example, a refinery, having stores, for example an oil tank, with a minimum and maximum fill level. Different raw materials, such as different types/grades of crude oil, are supplied sequentially in a predetermined quantity of batches at predetermined time periods and transported to the stores. The batches are then processed in at least one processing facility, such as a crude oil distillation plant, into primary products which are stored in additional stores and are optionally available for processing in another production stage or for delivery. The optimal sequence for supplying and processing the batches in the predetermined time period is determined by sequentially optimizing the rank order of each batch so as to minimize or eliminate the sum of infeasibilities, such as overfill and underfill time intervals, for the stores and the additional stores.

11 Claims, 1 Drawing Sheet

PROCESS FOR OPTIMIZING PROCESS FLOWS

CROSS-REFERENCES TO RELATED APPLICATIONS

This application claims the priority of Austrian Patent Application, Serial No. A 1356/2004, filed Aug. 9, 2004, pursuant to 35 U.S.C. 119(a)-(d), the subject matter of which is/are incorporated herein by reference.

BACKGROUND OF THE INVENTION

The present invention relates to a process for optimizing a process flow, and more particularly to optimizing a process flow in a facility having storage facilities (stores) for various raw materials which are supplied to the stores and are processed sequentially.

Nothing in the following discussion of the state of the art is to be construed as an admission of prior art.

Production in industrial processes in general and in the oil industry in particular, is realized in several sequentially arranged planes. Each of these stages includes the actual production step and storage of the produced quantities in specifically provided storage facilities, subsequently referred to as stores or tanks, which are then available for the next production step. The following scenario applies to the production system of a refinery for crude oil:

Crude oils of different composition are purchased in minimum quantities (batches), for example in a petroleum port, are delivered, transported to the refinery, for example, pumped through pipelines, stored on the refinery premises, and then distilled into final products (kerosene, gasoline, oil, gas), which are again stored. Storage tanks are provided exclusively for specific grades of crude oils and/or end products.

The selection of the sequential order (sequence) of the processing of the batches results in different utilization rates of the storage tanks and distillation facilities. Certain hypothetical sequences can also cause infeasibilities, such as time periods when the stores are overfilled and underfilled, or the pumping power is exceeded.

It is therefore an objective to determine a sequence for the processing of batches which minimizes or eliminates these infeasibilities.

Calculating the possible permutations of N, for example 15, batches would require N!, for this example 15! or approximately $10^{12}$ computations, making computation within an acceptable time no longer possible.

It would therefore be desirable and advantageous to provide a process which obviates prior art shortcomings and which allows optimization of resources (stores, crude oils, facilities) for refining desired end products, and is able to specifically prevent infeasibilities and optimize sequences with the least computational effort.

SUMMARY OF THE INVENTION

According to one aspect of the present invention, an optimal sequence for the delivery and processing of batches in the predetermined time period is determined by sequentially optimizing the rank positions of a corresponding batch, so that the sum of infeasibilities, such as the time periods when overfilling and/or underfilling occurs, for the stores are minimized or entirely eliminated.

When the sequential order of the batches is optimized in this manner, a significantly smaller number of combinations have to be computed (approximately $10^4$ is a reasonable number for 15 batches), so that the required parameters can be computed in an adequately short time.

According to another feature of the present invention, the infeasibility can be recalculated after each transposition of two rank positions of a corresponding batch only for the particular transposition time window, which is bounded by the two transposed rank positions. The recalculated infeasibility is then compared with the infeasibility before the transposition. This approach can further minimize the required computing time.

According to another feature of the present invention, in a subsequent pass of the process, at least one batch can be subdivided into at least two subunits. In this way a more refined optimization can be realized.

According to another feature of the present invention, operating parameters, such as throughputs, fraction temperatures, can be optimized in addition after a pass through the process. As a result, infeasibilities can be further reduced.

According to another feature of the present invention, the sequential order and operating parameters can be optimized successively several times after a pass through the process. In this way, the iterative process can be further optimized.

According to another feature of the present invention, the process can be applied to several connected facilities. In this way, even complex facility systems, for example refineries, can be optimized so as to minimize infeasibilities.

The invention is also directed to a computer program product, which can be loaded directly into an internal memory of a computer and is executed on the computer, wherein the computer program product includes software segments for performing the steps of the aforedescribed process. The computer program product can readily provide the process of the invention to a control system for an industrial process.

The invention is also directed a data carrier with the aforedescribed computer program product. In this way, the computer program product can be readily made available.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
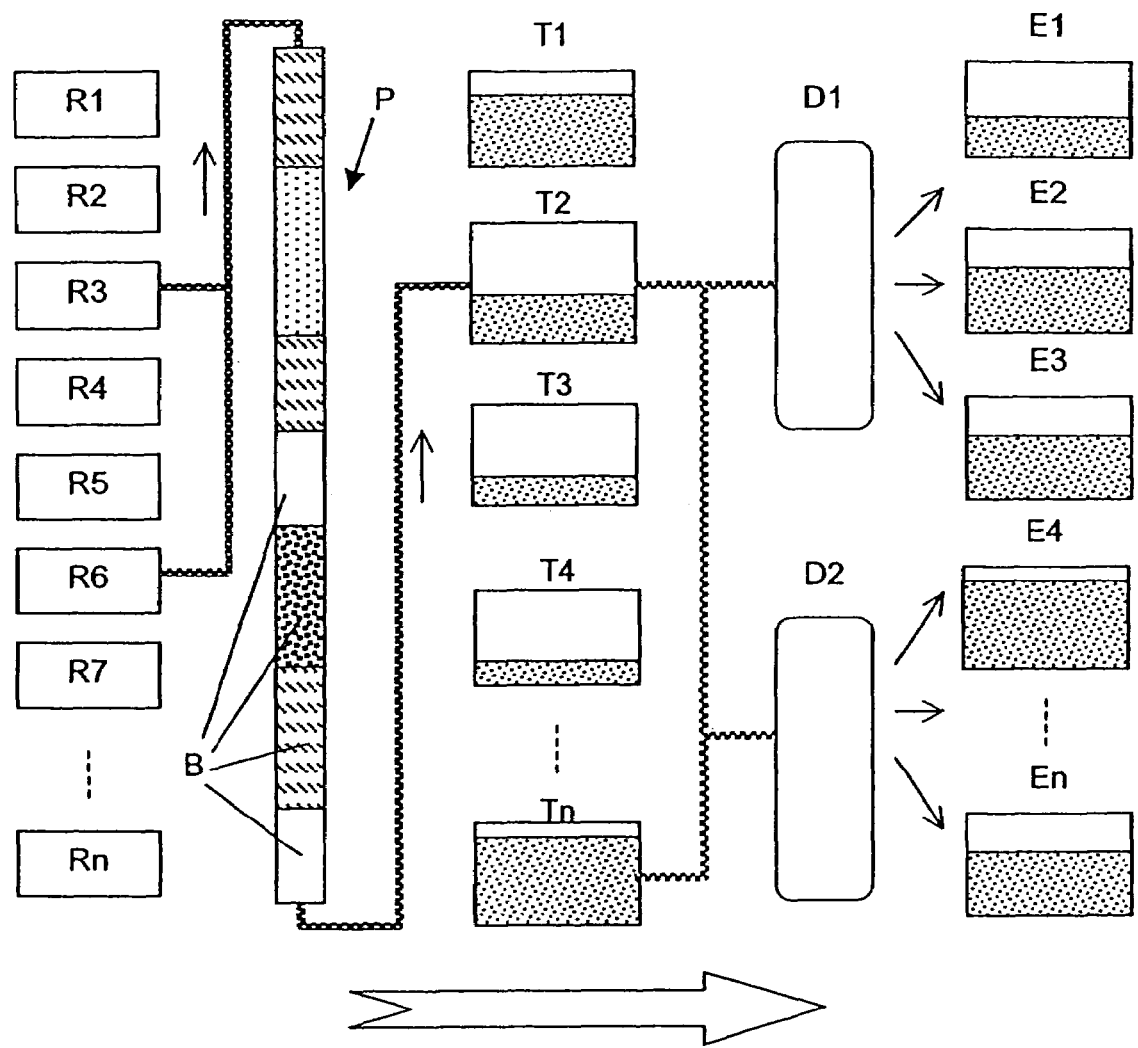
FIG. 1 shows schematically an exemplary process flow of a crude oil refinery.

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown an exemplary process flow of a crude oil refinery. Batches B of crude oils are purchased at a petroleum port and stored on the port premises in crude oil tanks R1 to Rn. The batches B are transported via a pipeline P and intermediately stored in tanks T1 to Tn on the refinery premises, processed in distillation facilities D1, D2 into primary products (gases, gasoline, kerosene, gas oil), and stored in delivery tanks E1 to En for the next production stage, mixing or delivery.

Because the production quantities for the respective production steps, as well as the properties of the produced fractions are different depending on the grade of the crude oil, the temporal order in which the crude oils reach production is important for the entire process. The operating parameters (operating characteristics) of the facilities, which are determined by the characteristic properties of the crude oil grades, are therefore different depending on the temporal sequential order of the crude oil batches.

Typically, the crude oils and facility parameters are determined according to the demand for finished products for a time period of one month by using a linear optimization program (LP). The LP, however, is only capable to compute monthly averages. The result of an LP is typically a demand for N—generally about 15—different crude oil batches. To thoroughly investigate the effect of the sequential order on the production, 15! (15 factorial) or approximately $10^{12}$ different situations, would have to be solved, which is obviously impossible within a reasonable time.

For determining an optimal sequential order, a process has been developed which investigates only $N^2$ individual transpositions instead of the entire set of N! possible transpositions. The individual transpositions are permutated recursively until the infeasibilities for times less than one month completely disappear or are minimized for the tanks, i.e., do not become smaller with another sequential order. If residual conflicts remain, then these are sent by a control function to the LP, which is solved again by taking into consideration the remaining tank conflicts. Generally, for N=15, the optimal tank fill level and operating temperature of the facilities shown in Table 1 is obtained after five to ten recursions of LP and optimizing the sequential order.

TABLE 1

| File Name | ObjFn | Gross Margin | SUM Inf | Inf |
| --- | --- | --- | --- | --- |
| Q-1005-00.shd | 11518.7 | 9791.311 | 27.412 | 26.722 |
| Q-1005-01.shd | 11518.8 | 9791.404 | 111.350 | 108.663 |
| Q-1005-02.shd | 11514.1 | 9786.711 | 313.906 | 179.221 |
| Q-1005-03.shd | 11490.3 | 9762.883 | 24.483 | 43.898 |
| Q-1005-04.shd | 11490.9 | 9763.563 | 120.244 | 127.818 |
| Q-1005-05.shd | 11481.9 | 9754.553 | 38.816 | 41.667 |
| Q-1005-06.shd | 11481.7 | 9754.367 | 43.903 | 43.472 |
| Q-1005-07.shd | 11451.6 | 9724.224 | 3.671 | 9.829 |

ObjFn herein indicates the optimal target function after each LP execution, Gross Margin is the maximum cover (=revenues−variable costs), SUM Inf is the total infeasibility minimized by the sequential order algorithm over the entire processing system expressed in (Overfill/Underfill Quantities*Time), and Inf indicates the maximum infeasible overfill/underfill quantity.

The process flow can be described as follows:

An LP solution with average values for the time periods is read in. An arbitrary startup sequence for the facility charge is selected and the startup infeasibility $T_0$ in (Tons*Time) resulting for this sequence is calculated for the entire tank system T1 . . . Tn, E1 . . . En.

The time periods of the various operating characteristics are subdivided into process steps with predetermined minimum lengths (for example, one day). For example, sixteen one-day time slices and one 1.6-day slice is obtained for a period of 17.6 days.

The time slices n are transposed with (n+1) for all values n=1 to (N−1), which in this example is equal to sixteen. During each transposition of the time slices, the position for which the resulting total infeasibility over the entire production system is minimal is retained. Moreover, during each transposition, the infeasibility is computed only in the transposition time window and only for the tanks affected by this event. Before two time slices A and B are transposed, the infeasibility determined in the transposition time window is subtracted from the total infeasibility and is added again after each transposition. If the total infeasibility after the transposition is smaller, then B is placed before A.

After all N time slices of the respective facility have been pair-wise transposed, the transposition process for each operating characteristic is executed once more for all time slices so as to more finely subdivide the time sizes. In the aforedescribed example, after the position of the 1.6-day time slice has been fixed, it is checked again if the 0.6 days, by which that time slice exceeds the minimal processing duration, can be moved so as to be entirely or partially located next to another one-day slice, in order to further minimize the total infeasibility.

After the position of the first facility has been determined in this manner, the optimization process is now similarly performed on all facilities of the production system by stepwise determining all positions relative to one another. After the process has been performed across the entire processing system, the process is repeated across all facilities until the total infeasibility remains unchanged in a complete pass across the entire system. The optimal sequences are thereby determined.

If the total infeasibility becomes zero, then both the sequential order and the resulting operating parameters have been found. If a residual infeasibility remains, then the LP is solved again by a control function, taking into account the residual conflicts. This is repeated until the process has determined a partition devoid of conflicts.

A typical process flow is illustrated in Table 2.

TABLE 2

Starting infeasibility: 12017.854

| | Period 1 | It | AWP | RD4 | FP | HDS | RD2 |
| --- | --- | --- | --- | --- | --- | --- | --- |
| Time: | 12:54:05 | 01 | 11855.449 | 11553.767 | 11553.767 | 11553.767 | 11553.767 |
| Time: | 12:54:06 | 02 | 11519.545 | 11519.545 | 11519.545 | 11519.545 | 11519.545 |
| | Period 2 | It | AWP | RD4 | FP | HDS | RD2 |
| Time: | 12:54:12 | 01 | 6843.477 | 6806.472 | 6806.472 | 6806.472 | 6803.894 |
| Time: | 12:54:18 | 02 | 6732.523 | 6724.606 | 6724.598 | 6724.598 | 6724.296 |
| Time: | 12:54:23 | 03 | 6699.835 | 6698.954 | 6698.954 | 6698.954 | 6698.928 |
| Time: | 12:54:30 | 04 | 6696.477 | 6696.464 | 6696.464 | 6696.464 | 6696.464 |
| | Period 3 | It | AWP | RD4 | FP | HDS | RD2 |
| Time: | 12:54:37 | 01 | 1232.940 | 814.458 | 327.880 | 323.742 | 243.491 |
| Time: | 12:54:43 | 02 | 200.821 | 80.019 | 80.019 | 57.715 | 23.624 |
| Time: | 12:54:49 | 03 | 20.640 | 3.848 | 3.848 | 3.848 | 3.671 |
| Time: | 12:54:55 | 04 | 3.671 | 3.671 | 3.671 | 3.671 | 3.671 |

Ending infeasibility: 3.671

Period i hereby indicates the LP period (=time interval over which the LP computes an average solution), It indicates the number of recursive passes of the sequential algorithm for each LP Period (the process stops if the infeasibility does no longer change during a pass, i.e., in one row), AWP indicates the first facility plane (e.g., pipeline); RD4 and RD2 indicate a second facility plane (e.g., crude oil distillation), and FP and HDS indicate a third facility plane (e.g., vacuum distillation and desulphurization plant).

The process can be expressed in more formal terms as follows:

$$\overset{p}{\underset{i=1}{R}}\left[\sum_{j=1}^{o} A \sum_{k=1}^{n} F \underset{ll'=1}{\overset{m}{T_R}} (TotInf_0 - Inf_{ll'} + Inf_{l'l})\right] \to Min_{lkji}$$

wherein
$T_R$ transpositions for time slices ll'
F operating characteristic k
A facility j
R recursive pass i
Convergence criterion: $Min_i = Min_{i-1}$ While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A process for optimizing process flows in a facility having storage units for materials with a minimum and maximum fill level, comprising the steps of:
   supplying different materials sequentially in a predetermined number of batches within a predetermined time period;
   transporting the batches to the storage units;
   processing the batches in at least one processing facility to produce primary products;
   storing the primary products in additional storage units;
   determining an optimal sequential order for supplying and processing the batches within the predetermined time period by
   selecting an arbitrary startup sequence for the facility charge;
   calculating a startup infeasibility for the startup sequence for all storage units;
   subdividing the time period into N time slices with predetermined minimum time duration;
   transposing adjacent time slices {n; n+1} for all values n=1 to (N−1);
   computing the infeasibility only in a transposition time window and only for the storage units in the transposition time window; and
   retaining for each transposition time window a position for which a resulting total infeasibility over all storage units is minimal.

2. The process of claim 1, wherein the storage unit is an oil tank.

3. The process of claim 1, wherein the facility is a refinery.

4. The process of claim 1, wherein the primary products are available for another production stage or for delivery.

5. The process of claim 1, wherein the processing facility distills crude oil.

6. The process of claim 1, wherein an infeasibility comprises at least one of an overfill and underfill time interval.

7. The process of claim 1, further comprising the steps of after each transposition of two rank positions of corresponding batches, recalculating the infeasibility only for a time window when the transposition takes place, said time window being bounced by the two transposed rank positions, and comparing the recalculated infeasibility with the infeasibility before the corresponding transposition of two rank positions.

8. The process of claim 1, The process of claim 1, further comprising the step of subdividing at least one batch into two subunits when another pass through the process is performed.

9. The process of claim 1, further comprising the step of optimizing additional operating parameters, selected from throughput and step temperatures, after at least one pass through the process has been performed.

10. The process of claim 1, further comprising the steps of:
    subdividing at least one of the time slices following pair-wise transposition of all N time slices of the facility, and
    repeating pair-wise transposition of all original and subdivided time slices.

11. The process of claim 1, wherein the facility comprises several connected facilities.

* * * * *